Dec. 7, 1926.                                                    1,609,701
J. H. DOTY
MOLD SEPARATOR
Filed April 28, 1921        2 Sheets-Sheet 1

Inventor
John H. Doty

Dec. 7, 1926.

J. H. DOTY 1,609,701

MOLD SEPARATOR

Filed April 28, 1921

WITNESSES:
Philip E. Barnes
O. E. Bee.

Inventor
John H. Doty
By R. D. Trogner
Attorney

Patented Dec. 7, 1926.

1,609,701

UNITED STATES PATENT OFFICE.

JOHN H. DOTY, OF AKRON, OHIO, ASSIGNOR TO THE GOODYEAR TIRE & RUBBER COMPANY, OF AKRON, OHIO, A CORPORATION OF OHIO.

MOLD SEPARATOR.

Application filed April 28, 1921. Serial No. 465,238.

My invention relates to mold separators and it has, for its primary object, the provision of a machine of the above designated character which shall be particularly adapted for opening or separating the mating sections of molds, such as are employed in the manufacture of pneumatic tires.

The molds used in the manufacture of pneumatic tires, although not exceptionally large, are relatively heavy and, furthermore, during the vulcanizing process, there is a slight vacuum created within the mold which, of course, makes it difficult to open. The broad object of my invention, therefore, is to provide means for automatically separating the mating sections of a mold after the article being vulcanized therein is ready for removal.

One distinct advantage of my invention is the fact that the machine provided thereby is entirely automatic in operation and, furthermore, it is actuated by movement of the molds to be separated or opened.

The various objects and advantages residing in my invention will become apparent from a detailed description of a preferred form of machine, which is illustrated in the drawings and set forth in the appended claims.

Figure 1:
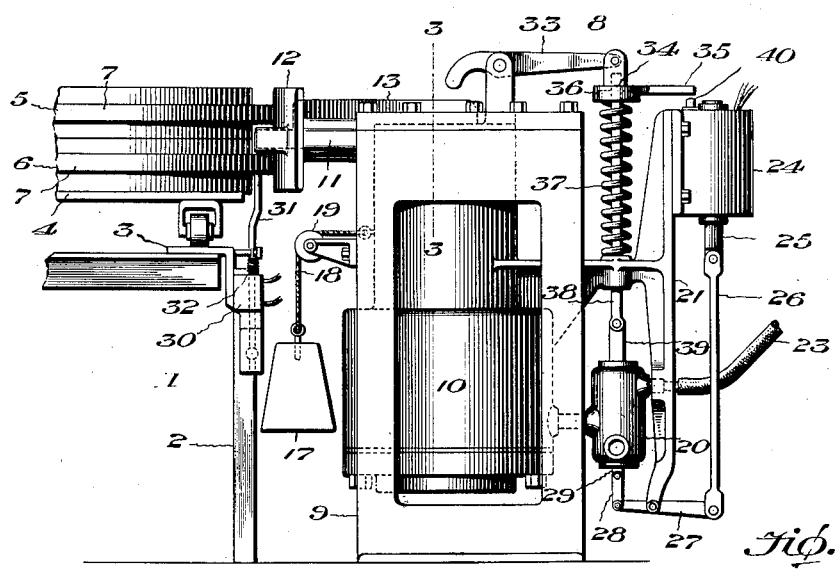
Fig. 1 is a side elevational view, parts being broken away, of a machine constructed in accordance with my invention disposed in operative relation with respect to a conveyor for molds to be opened thereby.

In practicing my invention, I utilize a conveyor for molds, which includes a track upon which a truck for carrying the molds is adapted to ride, and a machine for separating the mating sections of the molds is disposed in operative relation with respect to the conveyor. The mold separator comprises, broadly, a frame upon which is movably mounted a cylinder having mold engaging arms and in which a piston, also having a mold engaging arm, is fitted. The piston and, consequently, its mold engaging arm, is given vertical movement with respect to the cylinder and its mold engaging arms by means of air or other fluid under pressure admitted to the cylinder through a valve controlled by an electromagnetic device and a mechanical mechanism. The electromagnetic device is utilized primarily to effect admission of the fluid under pressure to the cylinder and the mechanical device, which is operated by the piston, is utilized to close the valve to cause release of the fluid pressure in the cylinder.

For a clear and accurate understanding of my invention, reference may be had to the drawings in which is shown a mold conveyor 1 comprising a frame 2 upon which is mounted rails 3 to provide a track for mold carrying trucks 4. The molds that are operated upon, are formed of mating sections 5 and 6, each of which has a peripheral flange 7.

Figure 3:
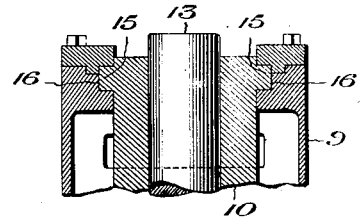
Fig. 3 is a sectional view taken substantially along the lines 3—3 of Fig. 1 to illustrate a detail of construction.
Figure 2:
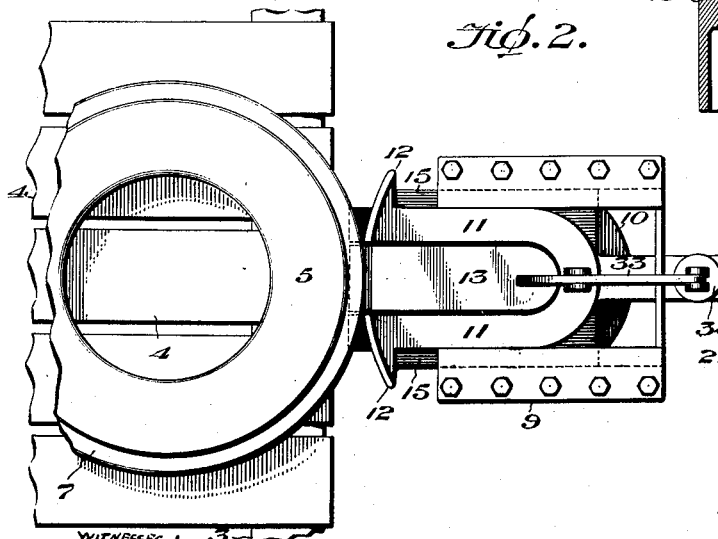
Fig. 2 is a plan view of the machine illustrated in Fig. 1.
Figure 4:
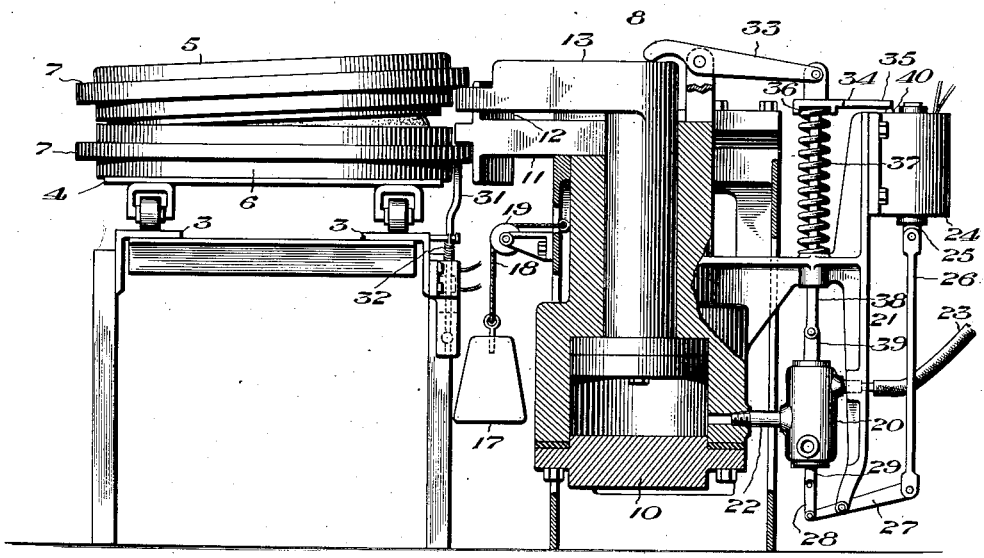
Fig. 4 is a side view, partially in elevation and partially in section, which shows further details of construction of a machine constructed in accordance with my invention.
Figure 5:
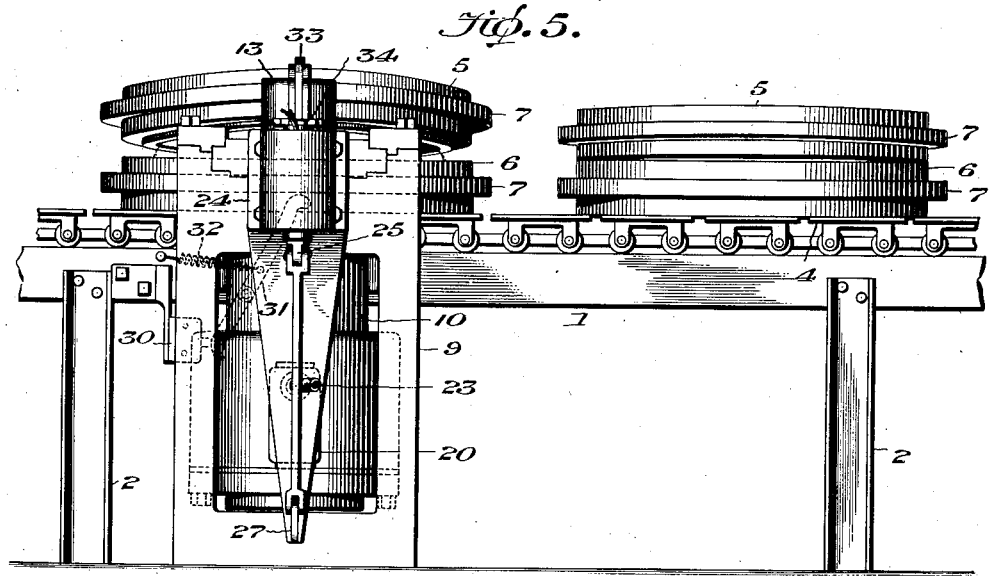
Fig. 5 is an end view of the machine illustrated in the previous figures.

A mold separator 8, constructed in accordance with my invention, includes a frame 9 upon which is movably mounted a cylinder block 10 having mold engaging arms 11. The mold engaging arms 11 are each preferably formed with an arcuate flange 12 which engages the edges of the mold and the ends thereof project between the flanges 7 of the mating sections of the molds. A piston 13 is fitted within the cylinder 10 and is formed at one end with a mold engaging arm which lies between the mold engaging arms 11 of the cylinder. As indicated in Fig. 3, the cylinder 10 is mounted upon the frame 9 by means of flanges 15 seated in a channel 16 of the frame and, since the cylinder and its piston are mounted as a unit, they are both horizontally movable upon the frame 9.

In order to maintain the cylinder and its piston in an operative position with respect to the molds upon the conveyor 1, a weight 17 is connected to the cylinder by means of a cable 18 passed over a pulley 19 mounted upon the frame 9. The weight 17 maintains the cylinder and its piston always in a forward position and, consequently, in proper position for the mold engaging arms to extend between the flanges of the molds as the latter are advanced along the conveyor.

In order to control the admission and release of fluid under pressure to raise or lower the piston 13 fitted within the cylinder 10, a valve 20 is mounted upon a frame 21 connected to the cylinder and forms a part thereof. The valve 20 is connected by means of a conduit 22 to the cylinder 10 and by means of a flexible conduit 23 to a source of fluid under pressure (not shown). An electromagnetic device 24, comprising a solenoid having a core 25 mounted upon the frame 21, is adapted to control the inlet opening of the valve 20 by the connection of its core 25 to a link 26 which is, in turn, connected to an arm 27 pivoted upon the frame 21 and pivotally connected to a link 28 also connected to an operating arm 29 of the valve. The electromagnetic device 24 is energized through a suitable electrical circuit adapted to be closed by a normally open switch 30 mounted upon the frame 2 of the conveyor and operated by an arm 31, which is pivotally mounted upon the frame 2 and maintained in an upright or inoperative position by means of a spring 32. The arm 31 extends above the track 3 and is consequently adapted to be engaged by the molds or their carriages as they are moved along the conveyor to close the switch 30, thereby effecting energization of the electromagnetic device 24.

To provide means for releasing the fluid pressure established in the cylinder block 10 after a mold has been opened or separated, a mechanical device is utilized comprising an arm 33 that is pivotally mounted upon the cylinder block 10, the arm having one free end which is adapted to be engaged by the piston 13 and being pivotally connected at its other end to a member 34 having a projecting arm 35. The member 34 is provided with a seat 36 which receives one end of a spring 37 mounted about a link 38 connected to the member 34 and to an arm 39 which is adapted to open an exhaust and close the inlet of the valve 20. The spring 37, being mounted between the frame 21 and the member 34, tends to always maintain the arm 33 in a horizontal or inoperative position. The arm 35 is adapted to engage and operate a push button switch 40, which opens the energizing circuit of the magnetic device 24.

The operation of the machine above described is entirely automatic since the molds cause fluid under pressure to be admitted to the cylinder 10 by engaging the arm 31, which closes the switch 30, and thereby effects energization of the electromagnetic device 24 which draws its core 25 to a central position within the solenoid and opens the inlet of the valve 20 by actuating the connecting lever arms.

When the fluid under pressure is admitted to the cylinder 10, the piston 13 is given relative movement with respect to the cylinder and the mold engaging arms are consequently separated, which effects separation of the mating sections 5 and 6 of the molds 4. When the piston 13 moves upward, it engages the free end of the arm 33, effecting compression of the spring 37 and causing the arm 35 to actuate the switch 40 and open the energizing circuit of the magnetic device 24. The lever arm 39 is also actuated to close the inlet valve and open the exhaust valve which, of course, permits the piston 13 to return to its initial position by the force of gravity.

By reason of the mold engaging arms being integral projections of the cylinder 10 and the piston 13, they are maintained always in alignment and, consequently, always properly engage the flanges of the separable sections of the molds. The entire control mechanism for the mold separator, with the exception of the switch which closes the energizing circuit of the electromagnetic device, is mounted upon a frame of the cylinder and consequently moves as a unit therewith. The movement of the cylinder and its accompanying equipment permits of considerable latitude of variation in the size of the molds being operated upon, as well as their exact position upon the track of the conveyor. The mold engaging arms are always maintained in operative position and the device as a whole requires little or no attention on account of its automatic operation and self-positioning features.

Although I have shown and described a preferred form of machine constructed in accordance with my invention, it is obvious that minor changes may be made therein without departing from the spirit and scope of my invention and I desire, therefore, that no limitations shall be imposed except such as are indicated in the appended claims.

What I claim is:

1. A mold separator comprising a plurality of oppositely disposed mold engaging members, electrically controlled means for separating the members, and means for automatically returning the members to their initial position.

2. A mold separator comprising a plurality of mold engaging members, means for maintaining the members always in alignment, electrically controlled means for separating the members, and means for automatically returning the members to their initial position.

3. A mold separator comprising a plurality of mold engaging members, means for maintaining the members always in alignment, means for maintaining the members in operative position, electrically controlled means for separating the members, and means for automatically returning the members to their initial position.

4. A mold separator comprising a plurality of mold engaging members movably supported as a unit, means for maintaining the members in operative position, electrically controlled means actuated by movement of a mold for separating the members and means for automatically returning the members to their initial position.

5. A mold separator comprising a plurality of mold engaging members movably supported as a unit, means for maintaining the members in operative position, electrically controlled means actuated by movement of a mold for separating the members and mechanical means for automatically returning the members to their initial position.

6. A mold separator comprising a plurality of mold engaging members movably supported as a unit, and means for automatically controlling the operation of the members mounted to move as a unit therewith.

7. A mold separator comprising a plurality of oppositely disposed mold engaging members including a movably supported frame provided with a chamber, a piston adapted for reciprocable movement within the chamber, electrically controlled means for admitting fluid under pressure into the chamber, and means for releasing the fluid pressure in the chamber.

8. A mold separator comprising a plurality of mold engaging members including a movably supported frame provided with a chamber, a piston adapted for reciprocable movement within the chamber, electrically controlled means for admitting fluid under pressure into the chamber, and mechanical means for automatically releasing the fluid pressure in the chamber.

9. A mold separator comprising a plurality of mold engaging members including a movably supported frame provided with a chamber, a piston adapted for reciprocable movement within the chamber, electrically controlled means for admitting fluid under pressure into the chamber, and mechanical means actuated by the piston for releasing the fluid pressure in the chamber.

10. The combination with a mold conveyor, of means for separating the mating sections of molds actuated by movement of the molds, said means including a cylinder having a mold engaging member, a piston fitted within the cylinder having a mold engaging member, electrically controlled means for admitting fluid under pressure into the cylinder and mechanically operated means for releasing the fluid pressure.

11. A mold separator comprising a supporting frame, a cylinder having mold engaging arms movably mounted upon the frame, a piston having a mold engaging arm fitted within the cylinder, a valve mounted upon the cylinder, an electromagnetic device connected to operate the valve mounted upon the cylinder, a switch for the magnetic device adapted to be operated by molds to be opened, a valve operating mechanism mounted upon the cylinder operated by the piston and a weight secured to and adapted to maintain the cylinder in an operative position.

In witness whereof I have hereunto signed my name.

JOHN H. DOTY.